Oct. 26, 1954  K. B. MAXWELL  2,692,707
MEASURING DISPENSING VALVE
Filed May 9, 1950
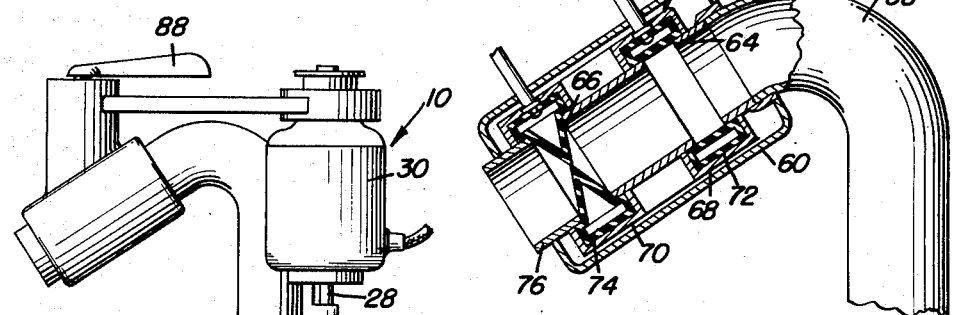
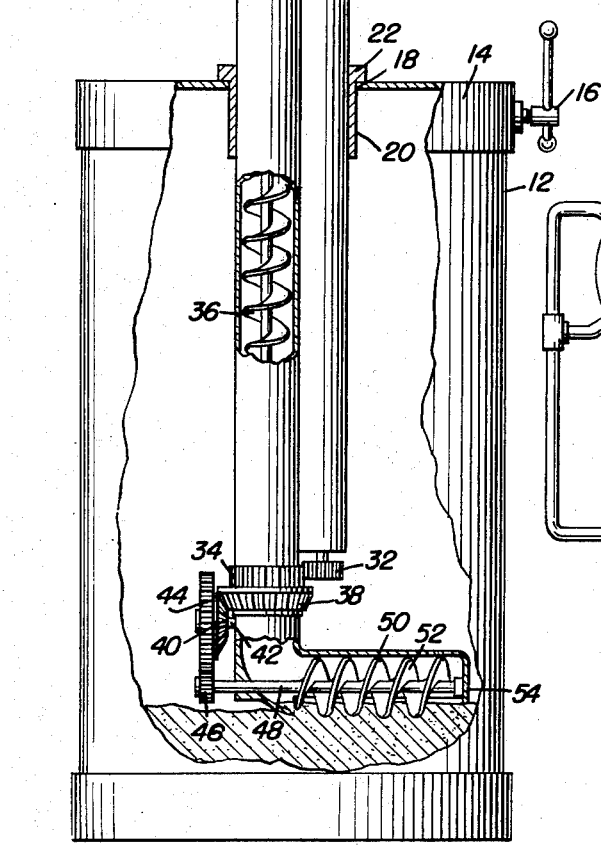
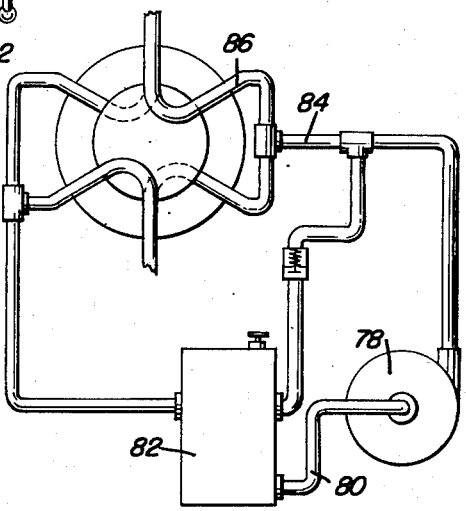
Keaton Bruce Maxwell
INVENTOR.

Patented Oct. 26, 1954

2,692,707

UNITED STATES PATENT OFFICE 2,692,707

MEASURING DISPENSING VALVE

Keaton Bruce Maxwell, Kansas City, Mo.

Application May 9, 1950, Serial No. 160,923

1 Claim. (Cl. 222—449)

This invention appertains to an apparatus for dispensing frozen confection, such as ice cream, from a can or receptacle and has for its primary object to automatically loosen a portion of the frozen confection and to dispense the portion through a discharge tube by means of a power driven worm rotatably mounted in the tube.

Another important object of this invention is to soften the confection, which is kept under refrigeration in the can at the time of dispensing, so that the confection may be easily conveyed upwardly in the discharge tube by means of the worm.

Another object of this invention is to provide a power driven means for dispensing the confection and to provide hydraulic valve means for controlling the delivery of the confection through the discharge spout on the tube.

Another object of this invention is to provide a compact, simple and inexpensive automatic dispensing apparatus, which can be easily and dependably employed in conjunction with any conventional frozen confection container or can for dispensing the confection into containers or packages.

These and ancillary objects and structural features of merit are attained by this invention, the preferred embodiment of which is set forth in the following description and illustrated in the accompanying drawings, wherein:

Figure 1 is an elevational view of a dispensing apparatus, constructed in accordance with the principles of this invention, with portions of the same broken away to illustrate the feed means, the apparatus being illustrated in operative attachment to a container or can;

Figure 2 is a sectional illustrative view of the valve control means on the delivery spout;

Figure 3 is a schematic showing of the hydraulic control means for the valve means.

Attention is directed to Figures 1 through 3, wherein the dispensing apparatus 10 is shown in operative attachment to a conventional frozen confection can or container 12, the same being formed with an open top on which a closure, or lid 14 is secured by means of a conventional clamp 16. The lid is formed with a central opening 18 within which a sleeve 20 is positioned by means of an enlarged collar 22 on the upper end thereof. A pair of tubular housings 24 and 26 are vertically mounted within the sleeve, with a drive shaft 28 being rotatably housed in the tube 24 and having an electric motor 30 drivingly attached to its upper end. A gear 32 is secured to the lower end of the drive shaft and is positioned in meshing engagement with a gear 34 on the lower end of the tubular housing 26. A worm 36 is rotatably journaled in the tubular housing 26 and driven by the gear 34, which is attached to its lower end.

A beveled gear 38 is secured to the gear 34 and is intermeshed with a vertically disposed beveled gear 40, which is fixed on a rotatable shaft 42 laterally extending from the lower end of the housing. A gear 44 is mounted on the shaft 42 and is in meshing engagement with a smaller gear 46 fixed on the outer end of a shaft 48.

A lateral extension 50 is formed on the lower end of the tubular housing 26 and the lower portion thereof is open. A worm 52 is formed on the shaft 48, the shaft being journaled in a bearing 54 formed on the outer end of the lateral extension 50.

The upper end of the tubular housing is bent outwardly and downwardly, as at 58, to receive a tubular sleeve or delivery spout 60. The sleeve 60 forms a housing for a valve control means 62. Thus, the outer end of the tubular housing, which is surrounded by the sleeve 60, is formed with annular cut-out portions 64 and 66. Annular channel members 68 and 70 surround the openings or cut-out portions and form housings for resilient annular hollow valves 72 and 74, which are rectangular in cross section. The outer end of the tube 76 forms a nozzle and the outer end of the sleeve is secured thereon.

Preferably, hydraulic means is provided for moving the valves inwardly, as seen in Figure 2, to close off the communication between the nozzle 76 and the tubular housing 26 to prevent discharge of the confection. Thus, as shown in Figure 3, a pump 78 is provided and is connected by a conduit 80 to a reservoir 82, the fluid in the reservoir being distributed to the fluid circuit 84 by the pump and line 86 communicating the circuit with a two way valve, a handle 88 controlling the actuation of the valve, so that the valves 72 and 74 may be sequentially and independently operated.

Having described the invention, what is claimed as new is:

In a measuring dispensing valve, the combination of a cylindrical housing including a side wall and a pair of end walls, a tubular inlet duct and a tubular outlet duct mounted coaxially in the respective end walls of said housing, a tubular intermediate duct disposed axially in the housing between the inlet and outlet ducts and in spaced relation therefrom, an annular inlet valve casing provided in the housing, said casing having a U- shaped cross-section and including an outer flange secured to said inlet duct and an inner flange secured to said intermediate duct, an annular outlet valve casing provided in the housing, said last mentioned casing having a U-shaped cross-section and including an outer flange secured to said outlet duct and an inner flange secured to said intermediate duct, said inlet and outlet valve casings bridging the spaces between the intermediate duct and the respective inlet and outlet ducts, a hollow annular valve member of deformable resilient material provided in each valve casing and projectable to a closed position in the space between the associated ducts, a pair of tubes extending through the side wall into said housing and communicating with the interior of the valve members in the respective inlet and outlet valve casings, and means for selectively delivering fluid under pressure through one of said tubes and simultaneously withdrawing fluid through the other tube whereby either of the valve members may be open while the other is closed, the adjacent end portions of said ducts projecting into the associated valve casings and providing supporting shoulders for side edge portions of the associated valve members.

References Cited in the file of this patent

UNITED STATES PATENTS

| Number | Name | Date |
|---|---|---|
| 1,632,165 | Bergmann et al. | June 14, 1927 |
| 2,026,916 | Smith | Jan. 7, 1936 |
| 2,233,085 | Schweickart et al. | Feb. 25, 1941 |
| 2,357,220 | Olson | Aug. 29, 1944 |
| 2,428,995 | Rogers | Oct. 14, 1947 |
| 2,467,150 | Nordell | Apr. 12, 1949 |
| 2,470,744 | Korn | May 17, 1949 |
| 2,493,395 | Elwell | Jan. 3, 1950 |
| 2,495,671 | Cellwork | Jan. 24, 1950 |
| 2,500,043 | Radtke | Mar. 7, 1950 |

FOREIGN PATENTS

| Number | Country | Date |
|---|---|---|
| 485,957 | Great Britain | May 27, 1938 |